US012255397B2

(12) United States Patent
Sezai

(10) Patent No.: US 12,255,397 B2
(45) Date of Patent: Mar. 18, 2025

(54) ANTENNA, ELECTRONIC APPARATUS, AND METHOD OF MANUFACTURING AN ANTENNA

(71) Applicant: JAPAN AEROSPACE EXPLORATION AGENCY, Tokyo (JP)

(72) Inventor: Toshihiro Sezai, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 0 days.

(21) Appl. No.: 17/907,566

(22) PCT Filed: Mar. 10, 2022

(86) PCT No.: PCT/JP2022/010606
§ 371 (c)(1),
(2) Date: Sep. 28, 2022

(87) PCT Pub. No.: WO2022/249644
PCT Pub. Date: Dec. 1, 2022

(65) Prior Publication Data

US 2024/0213686 A1 Jun. 27, 2024

(30) Foreign Application Priority Data

May 27, 2021 (JP) ................................ 2021-089062

(51) Int. Cl.

| | |
|---|---|
| ***H01Q 15/16*** | (2006.01) |
| ***H01Q 1/28*** | (2006.01) |
| ***H01Q 15/14*** | (2006.01) |

(52) U.S. Cl.
CPC ............... *H01Q 15/16* (2013.01); *H01Q 1/28* (2013.01); *H01Q 15/141* (2013.01)

(58) Field of Classification Search
CPC ............................ H01Q 15/16; H01Q 15/141
See application file for complete search history.

(56) References Cited

U.S. PATENT DOCUMENTS

| | | | |
|---|---|---|---|
| 2007/0182654 | A1 | 8/2007 | Rao et al. |
| 2010/0271681 | A1 | 10/2010 | Valach |

(Continued)

FOREIGN PATENT DOCUMENTS

| | | |
|---|---|---|
| JP | 3-179903 A | 8/1991 |
| JP | 2011-505777 A | 2/2011 |

(Continued)

OTHER PUBLICATIONS

Willard V.T. Rusch, "The Current State of the Reflector Antenna Art" (Year: 1984).*

(Continued)

*Primary Examiner* — Hoang V Nguyen
*Assistant Examiner* — Alladin Abdulbaki
(74) *Attorney, Agent, or Firm* — Saliwanchik, Lloyd & Eisenschenk

(57) ABSTRACT

An antenna according to an embodiment of the present invention includes a primary radiator and a reflector mirror. The primary radiator radiates radio waves. The reflector mirror reflects radio waves radiated from the primary radiator, has same aperture diameter and height as a parabolic reflector mirror whose aperture diameter is equal to or less than 1.7 times a wavelength of the radio waves, and has a non-parabolic surface as a mirror surface shape.

7 Claims, 9 Drawing Sheets

(56) References Cited

U.S. PATENT DOCUMENTS

| | | | |
|---|---|---|---|
| 2019/0104462 | A1 | 4/2019 | Schloemer |
| 2020/0266546 | A1 | 8/2020 | Sezai |

FOREIGN PATENT DOCUMENTS

| | | | | |
|---|---|---|---|---|
| JP | 6635566 | B1 * | 1/2020 | ............... H01Q 1/28 |
| JP | 2020-120153 | A | 8/2020 | |
| JP | 2020-536409 | A | 12/2020 | |

OTHER PUBLICATIONS

Office Action dated Apr. 12, 2023 in Australian Application No. 2022231768.
International Search Report dated May 24, 2022 in International Application No. PCT/JP2022/010606.
Canadian Office Action dated Jan. 29, 2024 in Canadian Application No. 3,172,568.
Office Action dated Mar. 11, 2024 in Korean Application No. 10-2022-7043883.
Office Action dated Aug. 27, 2024 in Korean Application No. 10-2022-7043883.
Office Action dated Nov. 1, 2024 in Canadian Application No. 3,172,568.

* cited by examiner (1)

(2)

(1)

(2)

(1)

(2)

(1)

(2)

ANTENNA, ELECTRONIC APPARATUS, AND METHOD OF MANUFACTURING AN ANTENNA

CROSS-REFERENCE TO RELATED APPLICATIONS

This application is the U.S. national stage application of International Patent Application No. PCT/JP2022/010606, filed Mar. 10, 2022, which claims the benefit under 35 U.S.C. § 119 of Japanese Application No. 2021-089062, filed May 27, 2021, the disclosures of each of which are incorporated herein by reference in their entirety.

TECHNICAL FIELD

The present invention relates to a technology of an antenna mounted on a flying object such as a rocket and an aircraft.

BACKGROUND ART

An antenna to be mounted on a flying object such as a rocket and an aircraft is required to uniformly radiate radio waves in a wide area and to withstand aerodynamic load and aerodynamic heat generated during a flight. The inventor of the present invention has proposed an antenna in Patent Literature 1 as an antenna that meets such requirements.

The antenna according to Patent Literature 1 includes a primary radiator and a parabolic reflector mirror. The antenna according to Patent Literature 1 can provide uniformly stable pattern characteristics in a wide area without generating null points in an antenna pattern on a hemisphere where radio waves are radiated by setting an aperture diameter of the parabolic reflector mirror to be equal to or less than 1.7 times a wavelength.

CITATION LIST

Patent Literature

Patent Literature 1: Japanese Patent Application Laid-open No. 2020-120153

DISCLOSURE OF INVENTION

Technical Problem

However, in the antenna according to Patent Literature 1, the primary radiator is placed very close to the parabolic reflector mirror as compared to a generally-used parabolic antenna because the aperture diameter of parabolic reflector mirror is small as equal to or less than 1.7 times the wavelength. Therefore, impedance characteristics of the primary radiator are strongly affected by the reflector mirror, and it is difficult to arbitrarily change the impedance characteristics of the primary radiator.

In view of the above-mentioned circumstances, it is an objective of the present invention to provide an antenna, an electronic apparatus, and a method of manufacturing an antenna, by which it is possible to arbitrarily change impedance characteristics of a primary radiator while maintaining uniformly stable pattern characteristics in a wide area.

Solution to Problem

An antenna according to an embodiment of the present invention includes a primary radiator and a reflector mirror.

The primary radiator radiates radio waves.

The reflector mirror reflects radio waves radiated from the primary radiator, has same aperture diameter and height as a parabolic reflector mirror whose aperture diameter is equal to or less than 1.7 times a wavelength of the radio waves, and has a non-parabolic surface as a mirror surface shape.

In the antenna according to the embodiment of the present invention, since the reflector mirror has the aperture whose diameter is equal to or less than 1.7 times the wavelength of radio waves, uniformly stable pattern characteristics in a wide area can be provided without generating null points in an antenna pattern on a hemisphere where radio waves are radiated.

Moreover, since the reflector mirror of the antenna according to Patent Literature 1 is a parabolic reflector mirror, i.e., a reflector mirror in a shape of a paraboloid of revolution, the shape of the reflector mirror is determined from the aperture diameter and height. On the other hand, the antenna according to the embodiment of the present invention adopts the reflector mirror of the non-parabolic surface whose shape is different from the paraboloid of revolution. That is, although the aperture diameter and height of the reflector mirror are set to be identical to those of the parabolic reflector mirror, the mirror surface shape is modified from the paraboloid of revolution. With such a configuration, the primary radiator can have impedance characteristics different from those obtained in a case where the reflector mirror has a parabolic shape. In the concrete, for the impedance of the antenna according to the embodiment of the present invention, a frequency band that matches a feed system can set to be narrower or wider than that of the antenna according to Patent Literature 1.

The non-parabolic surface may have a shape whose height from a mirror surface bottom portion of the reflector mirror is proportional to a distance from a center axis of the reflector mirror raised to an exponent excluding 2.

Alternatively, the non-parabolic surface may have a truncated conical surface, a partially spherical surface, a conical surface, a cylindrical surface, or the like.

Alternatively, the non-parabolic surface may have a shape combining two or more different non-parabolic surfaces.

The primary radiator may be disposed on an aperture plane of the reflector mirror or in a region of its inside.

The reflector mirror may have a dielectric material layer with which a region inside an aperture plane of the reflector mirror is filled.

An electronic apparatus according to an embodiment of the present invention has a configuration that the above-mentioned antenna is embedded in a cavity in a surface of or inside a mounting object on which the antenna is mounted.

A hole having the same shape and dimension as the reflector mirror is formed in a surface of or inside the mounting object. With this hole, the antenna can be mounted without projecting from the surface of the mounting object. In a case of a flying object such as a rocket and an aircraft, for example, this configuration greatly reduces aerodynamic load and aerodynamic heat. Since the antenna according to the embodiment of the present invention has a small aperture diameter, influence of forming the hole on the flying object is ignorably small. Moreover, in a case where the antenna according to the embodiment of the present invention is mounted inside or outside an electronic apparatus with a wireless communication function, such as a personal computer (PC), or a building, the antenna can be mounted without projecting from the surface by forming a hole with the same shape and dimension as the reflector mirror, for example, in a substrate of electronic components and the like are mounted, in an outer wall, interior wall, or ceiling surface of the building, or inside the mounting object. In addition, the footprint can also be reduced due to the reduced aperture diameter. The thickness and weight can be thus reduced in comparison with stick antennas and the like in the related art. Higher antenna gain can be obtained because the parabolic antenna is used as a basic configuration. The antenna can be made unremarkable by using the same color and patterns for a front surface of the antenna as the wall or ceiling of the building.

A method of manufacturing an antenna according to an embodiment of the present invention includes:

- designing a reflector mirror of a parabolic mirror surface that reflects radio waves radiated from a primary radiator, and has an aperture diameter equal to or less than 1.7 times a wavelength of the radio waves; and
- modifying the mirror surface to be a non-parabolic surface that has same aperture diameter and height as the parabolic surface.

Advantageous Effects of Invention

According to the present invention, it is possible to arbitrarily change impedance characteristics of a primary radiator while maintaining uniformly stable pattern characteristics in a wide area.

MODE(S) FOR CARRYING OUT THE INVENTION

Hereinafter, embodiments of the present invention will be described with reference to the drawings.

First Embodiment

Figure 1:
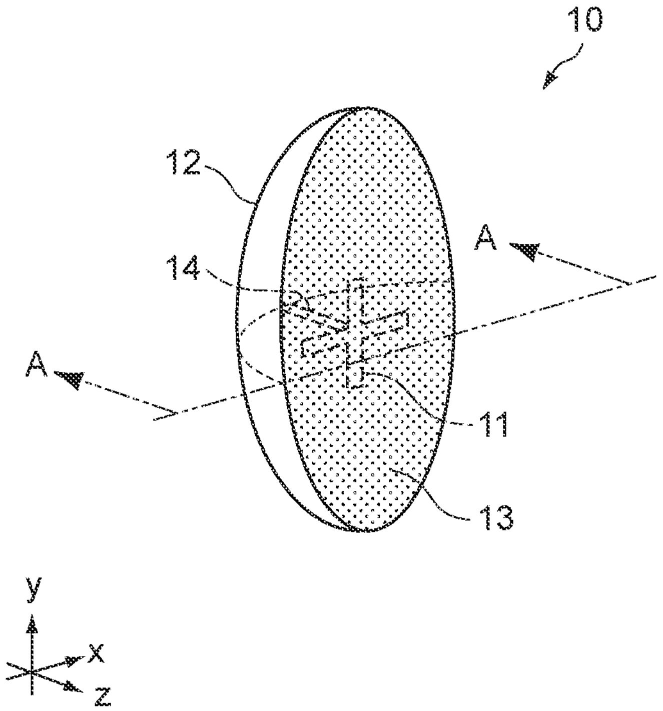
FIG. 1 A perspective view showing a configuration of an antenna according to an embodiment of the present invention.
Figure 2:
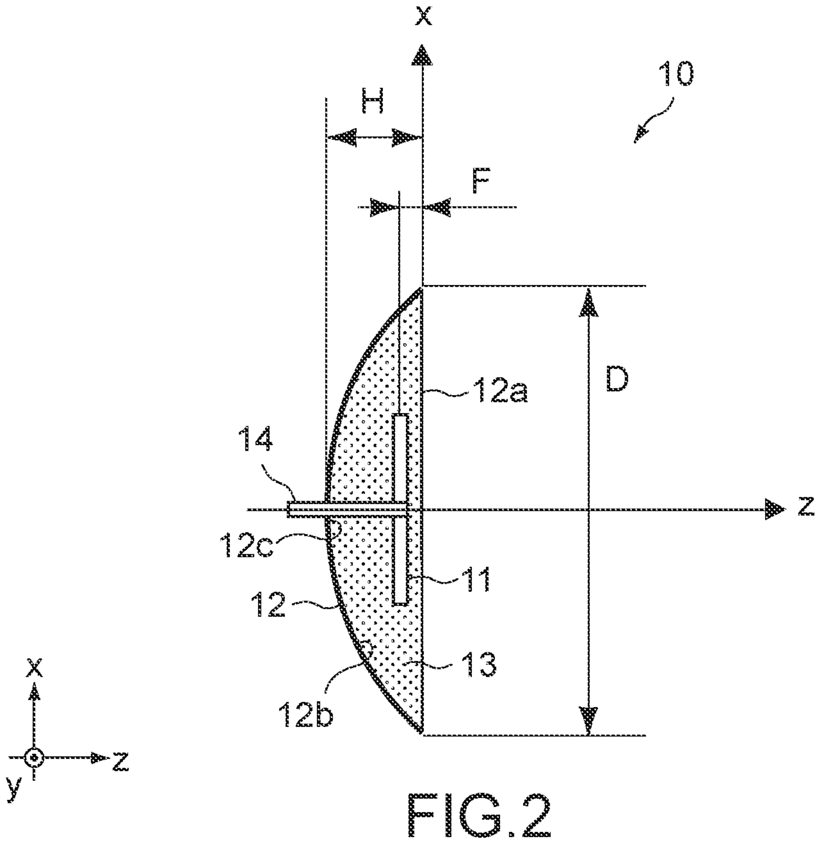
FIG. 2 A cross-sectional view taken along the line A-A of FIG. 1.

FIG. 1 is a perspective view showing a configuration of an antenna 10 according to an embodiment of the present invention. FIG. 2 is a cross-sectional view taken along the line A-A of FIG. 1. In each figure, the x-axis, the y-axis, and the z-axis denote three axis directions orthogonal to one another and the z-axis corresponds to a center axis of a reflector mirror 12 of the antenna 10.

[Overall Configuration of Antenna]

As shown in FIGS. 1 and 2, the antenna 10 includes a primary radiator 11 and the reflector mirror 12. The antenna 10 further includes a dielectric material layer 13 and a feed cable 14. A region inside an aperture plane 12*a* of the reflector mirror 12 is filled with the dielectric material layer 13. The feed cable 14 is connected to the primary radiator 11. The antenna 10 according to the present embodiment is mounted on a flying object such as a rocket and an aircraft.

The primary radiator 11 is an antenna element that radiates radio waves. Any antenna element can be used as the primary radiator 11 as long as the antenna element has a predetermined impedance. An example using a cross-dipole antenna is shown in the present embodiment. Alternatively, a dipole antenna, a horn antenna, or the like may be used.

The reflector mirror 12 has a diameter (aperture diameter) D of the aperture plane 12*a*, has a height H from a mirror surface bottom portion 12*c* to the aperture plane 12*a*, and is a reflector mirror, made of an electrically conductive material, which has a different shape (non-parabolic surface) from a paraboloid of revolution (parabolic surface). The primary radiator 11 is positioned at a depth F from the aperture plane 12*a* of the reflector mirror 12.

Moreover, the reflector mirror 12 reflects radio waves radiated from the primary radiator 11 and its aperture diameter D is reduced to be equal to or smaller than an aperture diameter which does not generate any null points in an antenna pattern on a hemisphere where the reflected radio waves are radiated. In the present embodiment, the reflector mirror 12 has the aperture diameter D equal to or less than 1.7 times the wavelength of radio waves. The aperture diameter D and the dimension of the primary radiator 11 can be reduced within a range enabling the antenna to function.

The range enabling the antenna to function means a range enabling the primary radiator 11 to provide a predetermined impedance. In other words, it means a range where a voltage standing wave ratio (VSWR) of the primary radiator 11 is equal to or smaller than a value required by a system using the antenna. Since no null points are generated in the antenna 10 according to the present embodiment, side lobes are also not generated as a matter of course. That is, the antenna 10 according to the present embodiment can radiate uniform radio waves in a wide area on the hemisphere where radio waves are radiated.

The dielectric material 13 is filled up in a region from the aperture plane 12*a* of the reflector mirror 12 to a mirror surface 12*b* that is an inner surface of the reflector mirror 12. The dielectric material that constitutes the dielectric material layer 13 is not particularly limited, and for example, a synthetic resin material such as high-density polyethylene, polytetrafluoroethylene or the like is used. The dielectric constant of the dielectric material is also not particularly limited, and can be arbitrarily set depending on kind, properties, and the like of a mounting object on which the antenna 10 is mounted.

The primary radiator 11 is disposed in the dielectric material layer 13. For example, the primary radiator 11 is disposed at a position on the aperture plane 12*a* or inside such a position. Moreover, the feed cable 14 is a coaxial cable for feeding power to the primary radiator 11. In FIGS. 1 and 2, an example that the feed cable 14 is provided to the primary radiator 11 through the mirror surface bottom portion 12*c* is shown. However, the path of the feed cable 14 is not limited as long as the feed cable 14 is located in the reflector mirror 12.

The dielectric material layer 13 functions to retain the primary radiator 11 and the feed cable 14 at predetermined positions. The dielectric material layer 13 also functions to protect the primary radiator 11 and the feed cable 14 from aerodynamic load and aerodynamic heat generated during a flight of a rocket or the like, and can further downsize the antenna 10 due to the wavelength reduction effect of the dielectric material. It should be noted that the dielectric material layer 13 may have a cavity (not shown). With this configuration, the antenna 10 can be reduced in weight.

Here, as for the antenna 10, the frequency of radio waves is 2.28 GHZ, the primary radiator 11 and the reflector mirror 12 are made of copper, high-density polyethylene is filled up as the dielectric material layer 13, the aperture diameter D is 96 mm, the height H of the reflector mirror 12 is 28 mm, and the depth F from the aperture plane 12*a* to the primary radiator 11 is 7 mm. It should be noted that the aperture diameter D is about 0.73 wavelength because the wavelength is about 132 mm.

[Details of Reflector Mirror]

As for the reflector mirror 12, the aperture diameter and height are the same as a parabolic reflector mirror, and the shape of the mirror surface 12*b* is a non-parabolic surface. The aperture diameter and height of the parabolic reflector mirror are correspond to the aperture diameter D and the height H of the reflector mirror 12, respectively. The aperture diameter D is equal to or less than 1.7 times the wavelength of radio waves radiated from the primary radiator 11 as described above.

As described above, the aperture diameter and height of the reflector mirror 12 in the antenna 10 according to the present embodiment are the same as the parabolic reflector mirror, but it is different in that the shape of the mirror surface 12*b* is the non-parabolic surface. The non-parabolic surface refers to, for example, (1) a shape whose height from the mirror surface bottom portion 12*c* of the mirror surface 12*b* is proportional to a distance from a center axis (z-axis) of the reflector mirror 12 raised to an exponent excluding 2, (2) a truncated conical surface, (3) a partially spherical surface, (4) a conical surface, (5) a cylindrical surface. The non-parabolic surface may be a shape arbitrarily combining two or more of (1) to (5) above. Moreover, for example, any value of 1 to 3 (excluding 2) can be adopted as the exponent of the exponentiation in (1) above.

Figure 3:
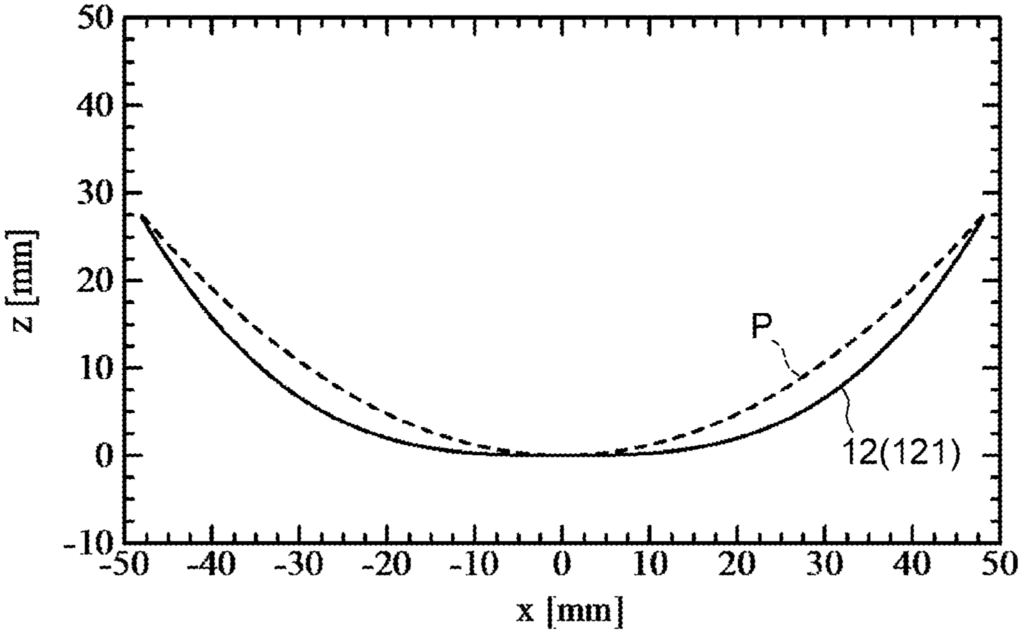
FIG. 3 A view for describing an embodiment of the antenna, which is a cross-sectional view of a shape whose height from a mirror surface bottom portion of a reflector mirror surface is proportional to a distance from a center axis raised to an exponent excluding 2.

For example, FIG. 3 is a cross-sectional view taken along the xz-plane, which shows a mirror surface shape of a reflector mirror 12 in an antenna 10 according to an embodiment of the present invention (solid line in the figure) as compared to a mirror surface shape of a parabolic reflector mirror P (dotted line in the figure) with the same aperture diameter D and the same height H. Here, a reflector mirror 121 adopting the mirror surface shape corresponding to (1) above is shown as the reflector mirror 12. The reflector mirror 121 has a mirror surface shape, with D=96 mm and H=28 mm, whose height from the mirror surface bottom portion 12*c* of the mirror surface 12*b* is proportional to the distance from the center axis (z-axis) cubed.

Figure 4:
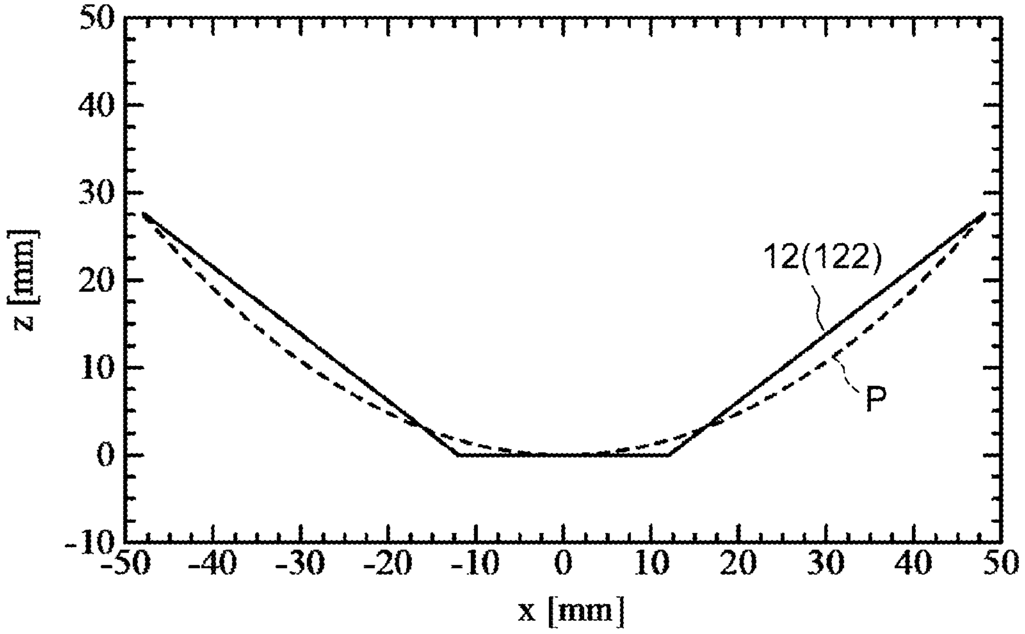
FIG. 4 A view for describing an embodiment of the antenna, which is a cross-sectional view in a case where a reflector mirror has a truncated conical shape.

FIG. 4 is a cross-sectional view taken along the xz-plane, which shows a mirror surface shape of a reflector mirror 12 in an antenna 10 according to another embodiment of the present invention (solid line in the figure) as compared to a mirror surface shape of the parabolic reflector mirror P (dotted line in the figure) with the same aperture diameter D and the same height H. Here, a reflector mirror 122 adopting the mirror surface shape corresponding to (2) above is shown as the reflector mirror 12. The reflector mirror 122 has a mirror surface shape whose bottom surface of the mirror surface 12*b* has an aperture diameter of 24 mm.

Figure 5:
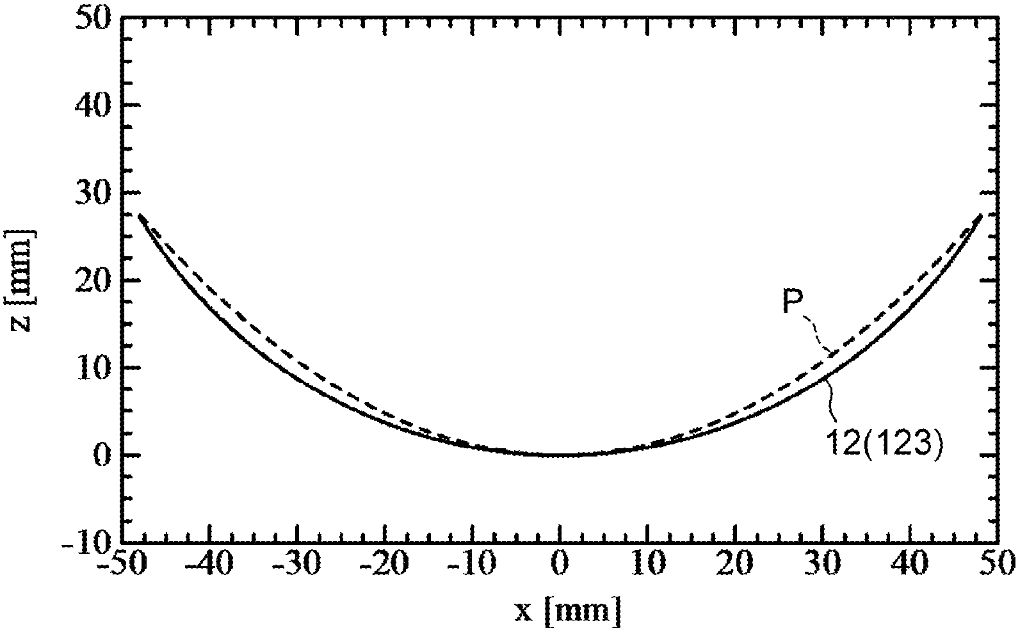
FIG. 5 A view for describing an embodiment of the antenna, which is a cross-sectional view in a case where a reflector mirror has a partially spherical surface shape.

FIG. 5 is a cross-sectional view taken along the xz-plane, which shows a mirror surface shape of a reflector mirror 12 in an antenna 10 according to still another embodiment of the present invention (solid line in the figure) as compared to a mirror surface shape of the parabolic reflector mirror P (dotted line in the figure) with the same aperture diameter D and the same height H. Here, a reflector mirror 123 adopting the mirror surface shape corresponding to (3) above is shown as the reflector mirror 12. The reflector mirror 123 has a mirror surface shape that is a partially spherical surface shape with D=96 mm and H=28 mm.

Figure 6:
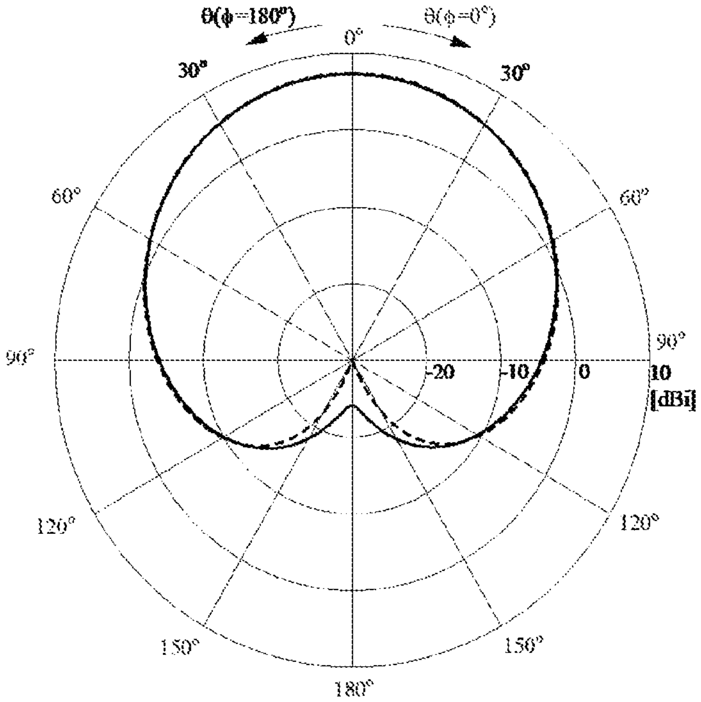
FIG. 6 A view for describing an embodiment of the antenna, which depicts analytic values of an antenna pattern (right-handed polarization) in the xz-plane in a case where the reflector mirror has a shape whose height from the mirror surface bottom portion of the reflector mirror surface is proportional to the distance from the center axis raised to an exponent excluding 2.
Figure 6:
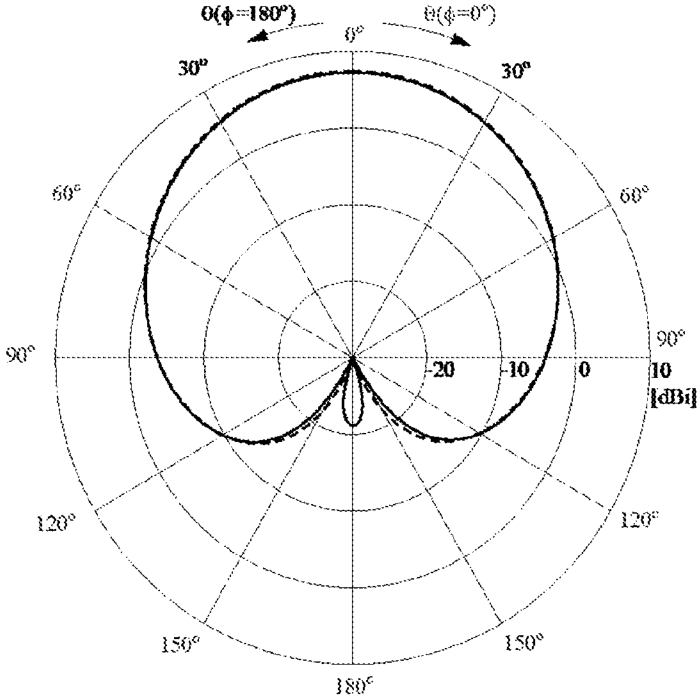

FIG. 6 depicts analytic values of an antenna pattern (right-handed polarization) of the antenna 10 according to the present embodiment in the xz-plane in a case where D=96 mm, H=28 mm, and F=7 mm and a shape whose height from the mirror surface bottom portion 12*c* of the mirror surface 12*b* is proportional to the distance from the center axis raised to an exponent excluding 2 is adopted. The FIG. 1), (2) shows a case of adopting a shape whose height from the mirror surface bottom portion 12*c* of the mirror surface 12*b* is proportional to the distance from the center axis to the power 1.5, 3.0, respectively. It should be noted that the dotted line in the figure denotes analytic values of the antenna pattern (right-handed polarization) of the antenna according to Patent Literature 1 in a case where D=96 mm, H=28 mm, and F=7 mm and the reflector mirror surface has a parabolic shape.

As it can be seen from FIG. 6, the antenna pattern of the antenna 10 according to the present embodiment is substantially identical to the antenna pattern of the antenna according to Patent Literature 1 in the area above the antenna aperture plane.

Figure 7:
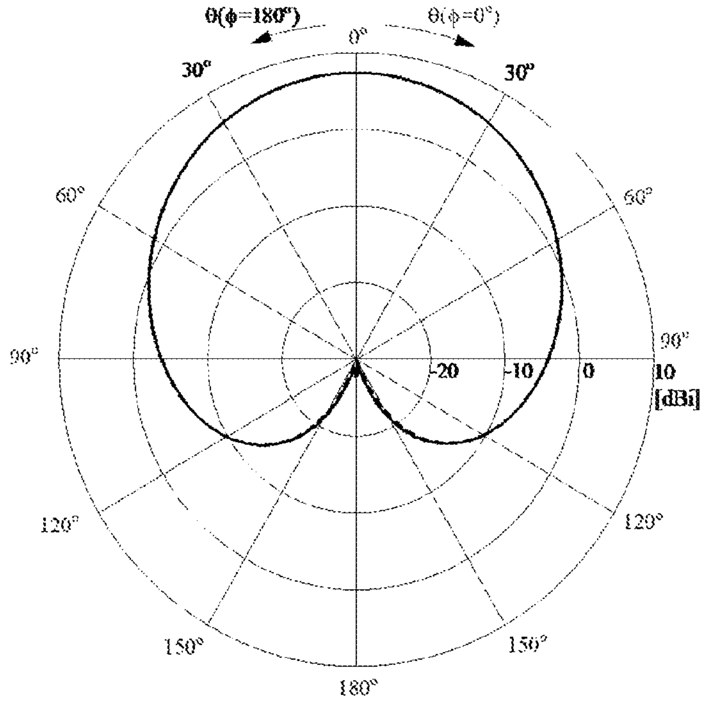
FIG. 7 A view for describing an embodiment of the antenna, which depicts analytic values of an antenna pattern (right-handed polarization) in the xz-plane in a case where the shape of the reflector mirror is a truncated cone.
Figure 7:
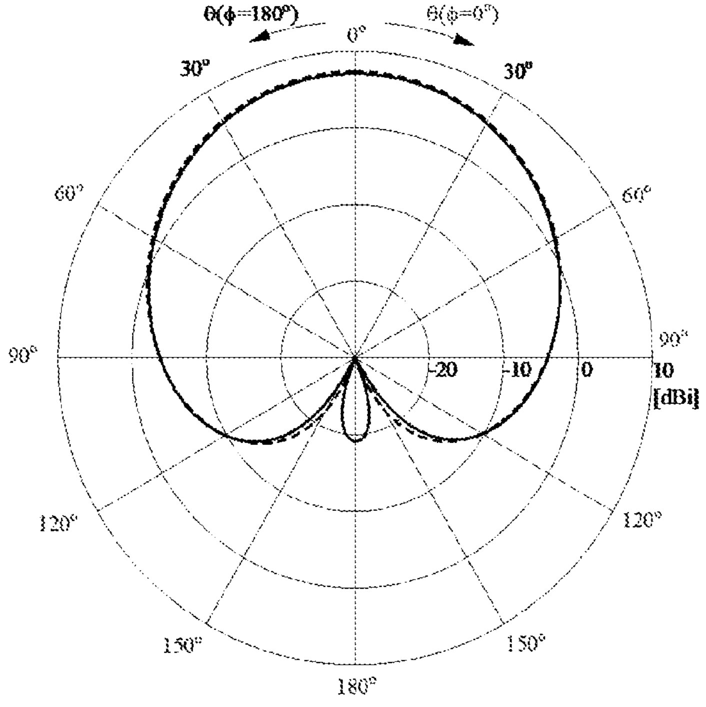

FIG. 7 depicts analytic values of an antenna pattern (right-handed polarization) of the antenna 10 according to the present embodiment in the xz-plane in a case where D=96 mm, H=28 mm, and F=7 mm and the shape of the mirror surface 12*b* is a truncated cone. The FIG. 1), (2) shows a case where the bottom surface of the mirror surface 12*b* has an aperture diameter of 24 mm, 48 mm, respectively. It should be noted that the dotted line in the figure denotes analytic values of the antenna pattern (right-handed polarization) of the antenna according to Patent Literature 1 in a case where D=96 mm, H=28 mm, and F=7 mm and the reflector mirror surface has a parabolic shape.

As it can be seen from FIG. 7, the antenna pattern of the antenna 10 according to the present embodiment is substantially identical to the antenna pattern of the antenna according to Patent Literature 1 in the area above the antenna aperture plane.

Figure 8:
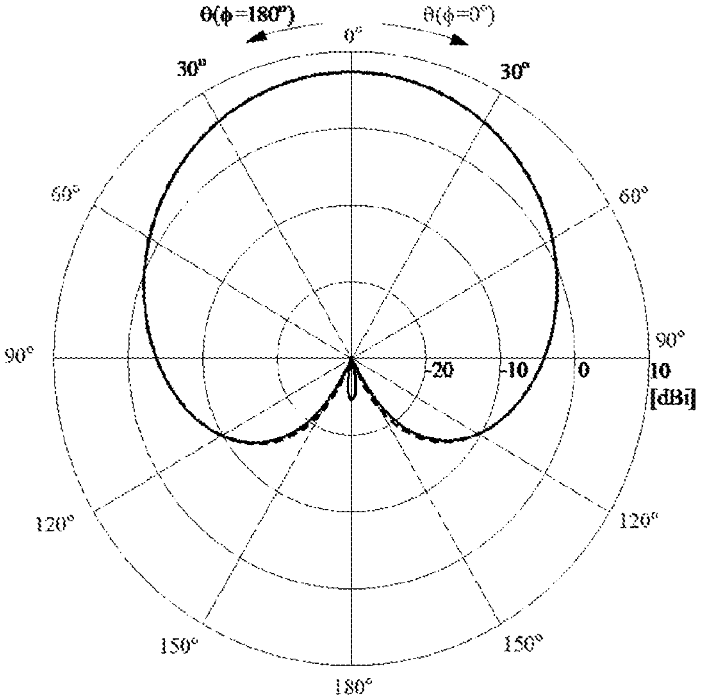
FIG. 8 A view for describing an embodiment of the antenna, which depicts analytic values of an antenna pattern (right-handed polarization) in the xz-plane in a case where the shape of the reflector mirror is a partially spherical surface.

FIG. 8 depicts analytic values of an antenna pattern (right-handed polarization) of the antenna 10 according to the present embodiment in the xz-plane in a case where D=96 mm, H=28 mm, and F=7 mm and the shape of the mirror surface 12*b* is a partially spherical surface. It should be noted that the dotted line in the figure denotes analytic values of the antenna pattern (right-handed polarization) of the antenna according to Patent Literature 1 in a case where D=96 mm, H=28 mm, and F=7 mm and the reflector mirror surface has a parabolic shape.

As it can be seen from FIG. 8, the antenna pattern of the antenna 10 according to the present embodiment is substantially identical to the antenna pattern of the antenna according to Patent Literature 1 in the area above the antenna aperture plane.

Figure 9:
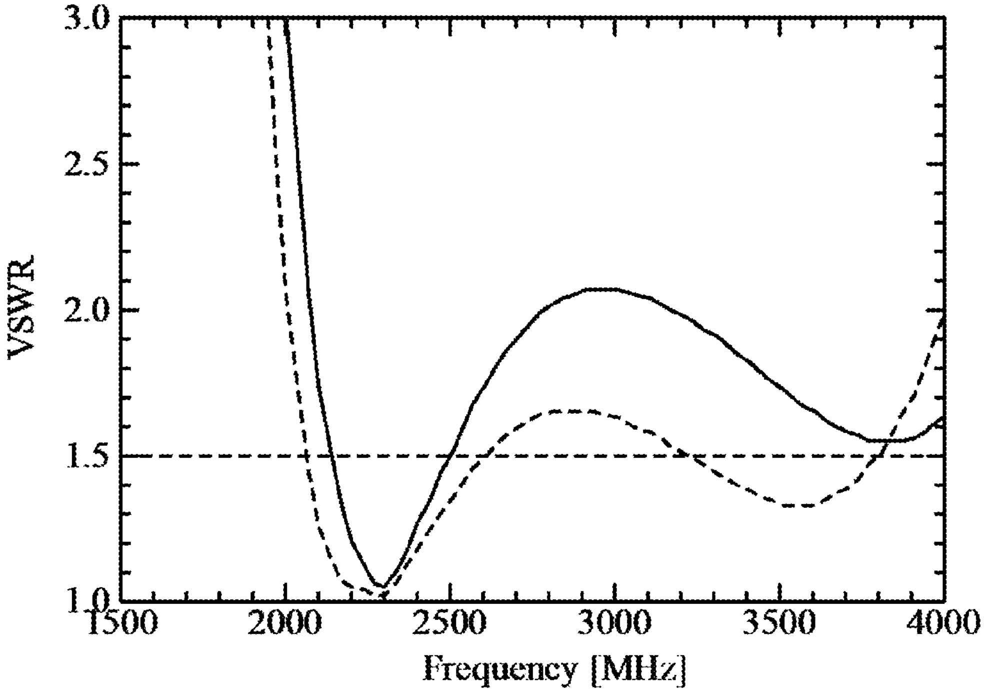
FIG. 9 A view for describing an embodiment of the antenna, which depicts analytic values of a voltage standing wave ratio (VSWR), with respect to 50Ω, which shows impedance characteristics of the primary radiator as frequency characteristics in a case of a shape whose height from the mirror surface bottom portion of the reflector mirror surface is proportional to the distance from the center axis raised to an exponent excluding 2.
Figure 9:
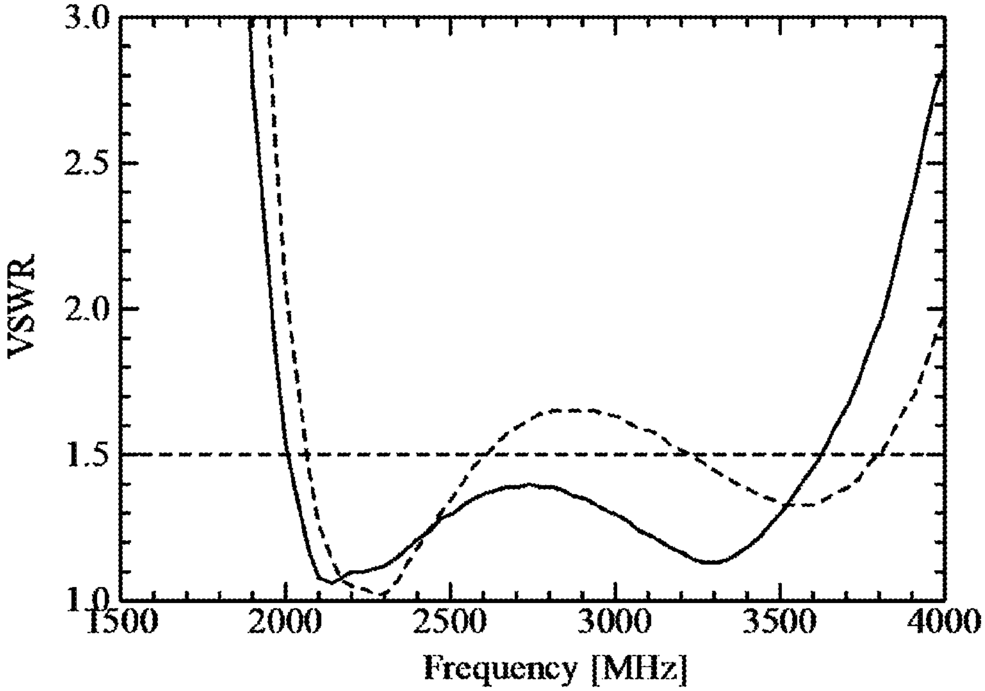

FIG. 9 depicts analytic values of the VSWR with respect to 50Ω as frequency characteristics, which shows impedance characteristics of the primary radiator 11 of the antenna 10 according to the present embodiment in a case where D=96 mm, H=28 mm, and F=7 mm and a shape whose height from the mirror surface bottom portion 12*c* of the mirror surface 12*b* is proportional to the distance from the center axis raised to an exponent excluding 2 is adopted. The FIG. 1), (2) shows a case of adopting a shape whose height from the mirror surface bottom portion 12*c* of the mirror surface 12*b* is proportional to the distance from the center axis to the power 1.5, 3.0, respectively. It should be noted that the dotted line in the figure denotes analytic values of the VSWR indicating impedance characteristics as frequency characteristics in a case where D=96 mm, H=28 mm, and F=7 mm and the reflector mirror surface has a parabolic shape, i.e., a primary radiator of the antenna according to Patent Literature 1.

Comparing the range where the VSWR is equal to or smaller than 1.5 in FIG. 9, it can be seen that the range in the FIG. 1) is narrower than that of the antenna according to Patent Literature 1 and the range in the FIG. 2) is wider than that of the antenna according to Patent Literature 1. It can be thus seen that the impedance characteristics of the primary radiator of the antenna can be changed by changing the shape of the reflector mirror.

Figure 10:
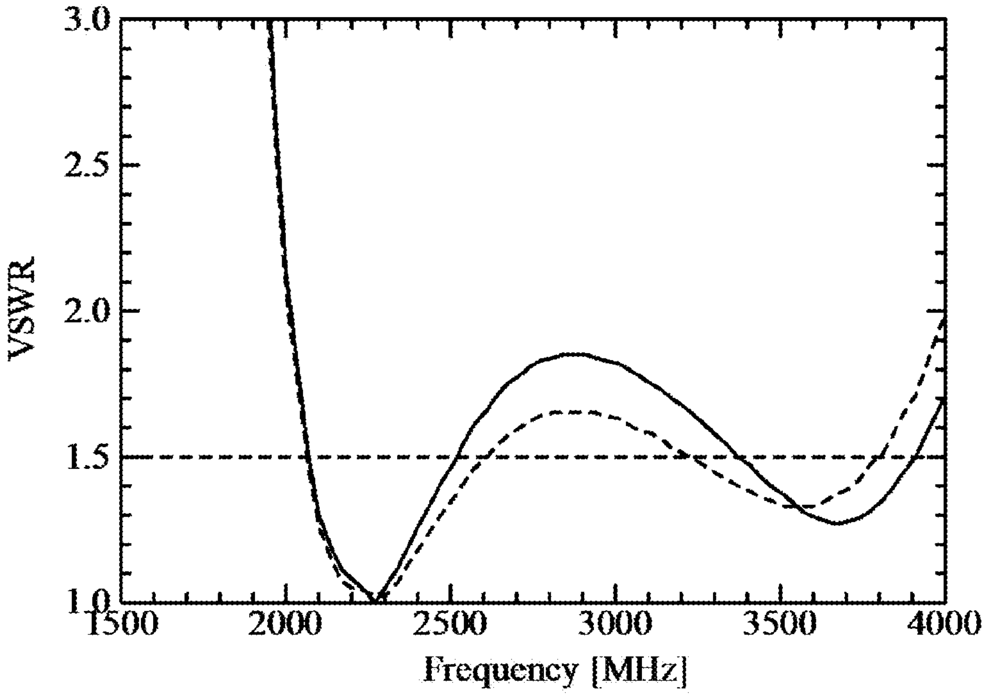
FIG. 10 A view for describing an embodiment of the antenna, which depicts analytic values of the VSWR with respect to 50Ω, which shows impedance characteristics of the primary radiator as frequency characteristics in a case where the shape of the reflector mirror is the truncated conical shape.
Figure 10:
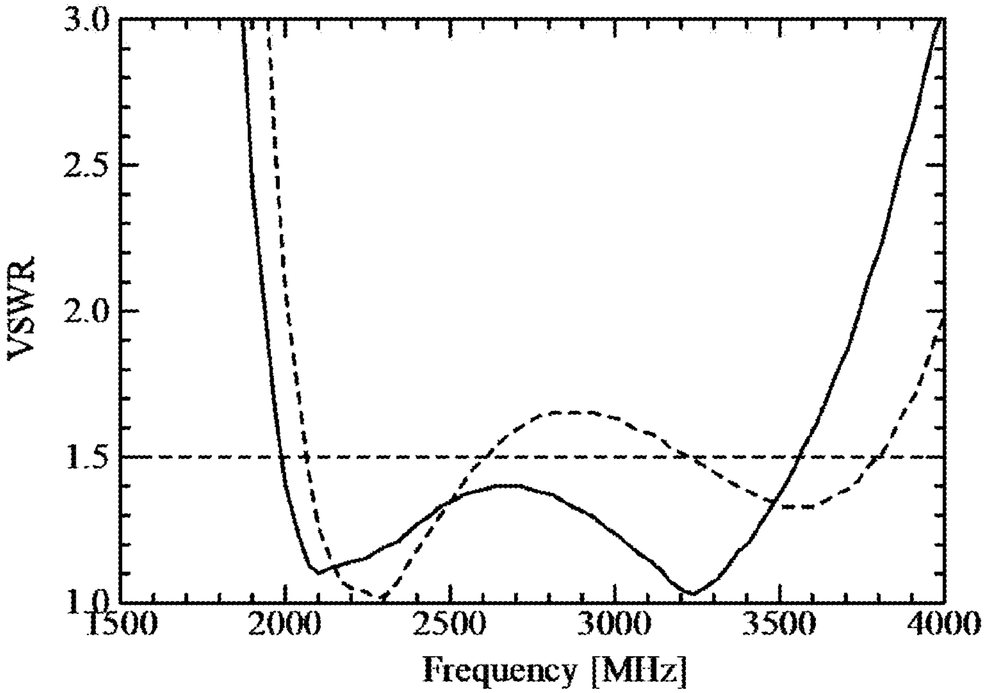

FIG. 10 depicts analytic values of the VSWR with respect to 50Ω as frequency characteristics, which shows impedance characteristics of the primary radiator 11 of the antenna 10 according to the present embodiment in a case where D=96 mm, H=28 mm, and F=7 mm and the shape of the mirror surface 12*b* is a truncated cone. The FIG. 1), (2) shows a case where the bottom surface of the mirror surface 12*b* has an aperture diameter of 24 mm, 48 mm, respectively. It should be noted that the dotted line in the figure denotes analytic values of the VSWR indicating impedance characteristics as frequency characteristics in a case where D=96 mm, H=28 mm, and F=7 mm and the reflector mirror surface has a parabolic shape, i.e., a primary radiator of the antenna according to Patent Literature 1.

Comparing the range where the VSWR is equal to or smaller than 1.5 in FIG. 10, it can be seen that the range in the FIG. 1) is narrower than that of the antenna according to Patent Literature 1 and the range in the FIG. 2) is wider than that of the antenna according to Patent Literature 1. It can be thus seen that the impedance characteristics of the primary radiator of the antenna can be changed by changing the shape of the reflector mirror.

Figure 11:
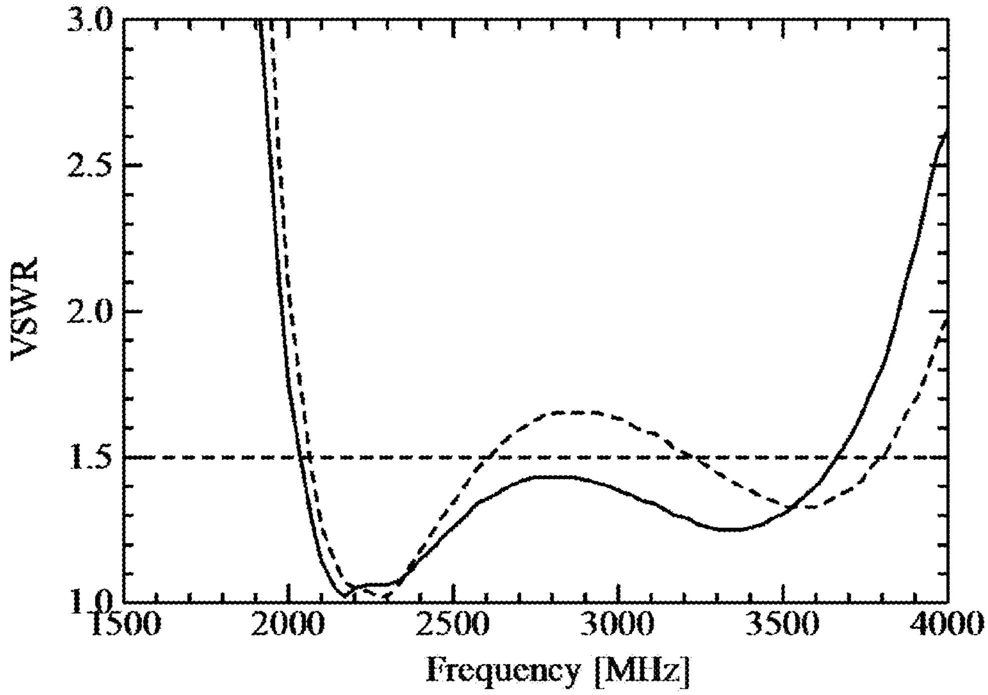
FIG. 11 A view for describing an embodiment of the antenna, which depicts analytic values of the VSWR, with respect to 50Ω, which shows impedance characteristics of the primary radiator as frequency characteristics in a case where the shape of the reflector mirror is the partially spherical shape.

FIG. 11 depicts analytic values of the VSWR with respect to 50Ω as frequency characteristics, which shows impedance characteristics of the primary radiator 11 of the antenna 10 according to the present embodiment in a case where D=96 mm, H=28 mm, and F=7 mm and the shape of the mirror surface 12*b* is a partially spherical surface. It should be noted that the dotted line in the figure denotes analytic values of the VSWR indicating impedance characteristics as frequency characteristics in a case where D=96 mm, H=28 mm, and F=7 mm and the reflector mirror surface has a parabolic shape, i.e., a primary radiator of the antenna according to Patent Literature 1.

Comparing the range where the VSWR is equal to or smaller than 1.5 in FIG. 11, it can be seen that the range of the antenna 10 is wider than that of the antenna according to Patent Literature 1 according to the present embodiment. It can be thus seen that the impedance characteristics of the primary radiator of the antenna can be changed by changing the shape of the reflector mirror.

[Method of Manufacturing Antenna]

The antenna 10 according to the present embodiment configured in the above-mentioned manner is manufactured by designing a reflector mirror of a parabolic mirror surface with an aperture diameter equal to or less than 1.7 times the wavelength of radio waves and modifying the mirror surface to be a non-parabolic surface with the same aperture diameter and height as the parabolic surface.

Other than the shape whose height from the mirror surface bottom portion of the reflector mirror is proportional to the distance from the center axis of the reflector mirror raised to an exponent excluding 2 as described above, any shape such as a truncated conical surface, a partially spherical surface, a conical surface, and a cylindrical surface can be adopted as the non-parabolic surface depending on impedance characteristics and the like of a feed system of the primary radiator 11.

For modifying the mirror surface to be a non-parabolic surface, any method can be adopted so as to narrow or widen the frequency band that matches the feed system. As an example, the shape of a mirror surface formed as a parabolic surface is modified to be a non-parabolic surface by machine working or the like. As another example, a parabolic surface is modified to be a non-parabolic surface during a design process.

Actions of Present Embodiment

As described above, with the antenna 10 according to the present embodiment, since the reflector mirror 12 has the aperture diameter D equal to or less than 1.7 times the wavelength of radio waves, uniformly stable pattern characteristics in a wide area can be provided without generating null points in an antenna pattern on a hemisphere where radio waves are radiated (sec FIG. 4 in Patent Literature 1). More specifically, the following actions can be obtained.

- The antenna beam is widened, and radio waves are radiated to wide area. Radio waves can also be radiated to an area below the antenna aperture plane.
- There are no null points and hollows in the hemisphere above the antenna aperture plane.
- Owing to the reflector mirror antenna, the antenna pattern is not substantially affected by a shape and an antenna mounting portion of a mounting object on which the antenna is mounted.

Therefore, with the antenna 10 according to the present embodiment, the following actions are provided.

- Uniformly stable pattern characteristics in a wide area are provided, and the gain is higher as compared to an antenna mounted on a flying object in the current state.
- In a case where the antenna 10 is mounted on a flying object, a mounting object that is the flying object is not affected by operational limitations due to pattern characteristics.
- In a case where the antenna 10 is mounted on a flying object, aerodynamic load and aerodynamic heat generated in the antenna 10 are greatly reduced.
- The thickness and weight are reduced as compared to antennas in the related art, and the antenna can be made more unremarkable.

Moreover, in accordance with the present embodiment, the antenna can be mounted without projecting from the surface of the mounting object by forming a hole with the same shape and dimension as the reflector mirror in a surface of or inside the mounting object. With this configuration, for example, in a case of a flying object such as a rocket and an aircraft, aerodynamic load and aerodynamic heat are greatly reduced. Since the antenna according to the present embodiment has a small aperture diameter, influence of forming the hole on the flying object is ignorably small. Moreover, in a case where the antenna according to the embodiment of the present invention is mounted inside or outside an electronic apparatus with a wireless communication function, such as a personal computer (PC), or a building, the antenna can be mounted without projecting from the surface by forming a hole having the same shape and dimension as the reflector mirror, for example, in a substrate on which electronic components and the like are mounted, in an outer wall, interior wall, or ceiling surface of the building, or inside the mounting object. In addition, the footprint can also be reduced due to the reduced aperture diameter. The thickness and weight can be thus reduced in comparison with stick antennas and the like in the related art. Higher antenna gain can be obtained because the parabolic antenna is used as a basic configuration. The antenna can be made unremarkable by using the same color and patterns as the wall or ceiling for the aperture plane.

Furthermore, with the antenna 10 according to the present embodiment, since the antenna 10 has the same aperture diameter and height as the parabolic reflector mirror and the mirror surface shape is the non-parabolic surface, it is possible to change the impedance characteristics of the primary radiator of the antenna while maintaining the pattern characteristics of the antenna according to Patent Literature 1. More specifically, it is possible to set the frequency band that achieves impedance matching with the feed system of the primary radiator 11 to be narrower or wider than that of the antenna according to Patent Literature 1.

For example, in a case where the frequency band that achieves impedance matching with the feed system of the primary radiator 11 is set to be narrower, it is unnecessary to prepare a filter that cuts radio waves at a frequency wished to be removed.

On the other hand, in a case where the frequency band that achieves impedance matching with the feed system of the primary radiator 11 is set to be wider, it is unnecessary to prepare a plurality of antennas because a plurality of frequency ranges can be used only by the antenna 10 according to the present embodiment. Moreover, in a case where the antenna 10 according to the present embodiment is used for communication, the communication capacity can be increased.

Second Embodiment

Figure 12:
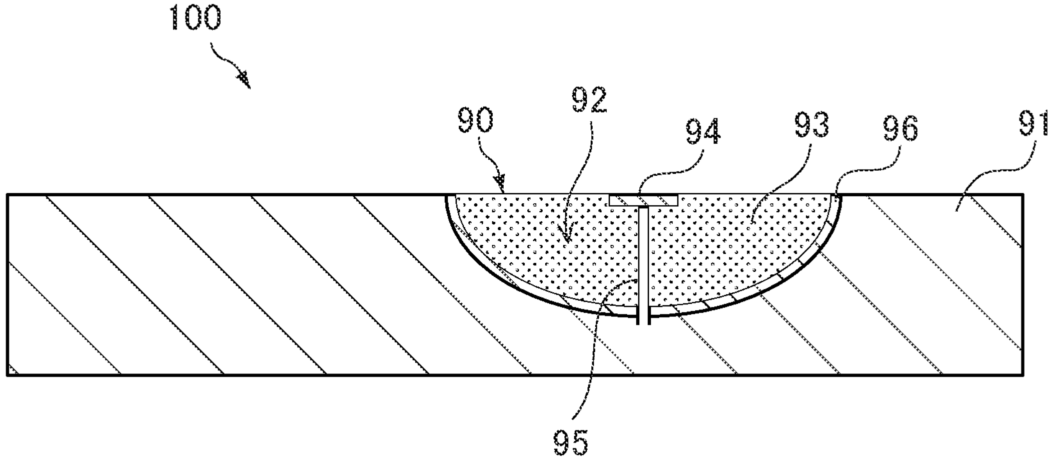
FIG. 12 A cross-sectional view of main parts of an electronic apparatus on which an antenna according to an embodiment of the present invention is mounted.

FIG. 12 is a cross-sectional view of main parts of an electronic apparatus 100 according to another embodiment of the present invention. The electronic apparatus 100 includes a substrate 91 and an antenna 90 embedded in a surface of the substrate 91.

As shown in FIG. 12, the substrate 91 is provided with a hole 92 matching the shape of the reflector mirror, and an electrically conductive thin film 96 is formed on a surface of the hole 92. The electrically conductive thin film 96 functions as a reflector mirror of the antenna 90. A dielectric material layer 93 constituted by a dielectric material such as high-density polyethylene is filled up in a region inside an aperture plane of the hole 92. A primary radiator 94 of the antenna 90 is disposed on the aperture plane of the hole 92 and is held by the dielectric material layer 93.

The hole 92 corresponds to a cavity provided in a surface of or inside a mounting object, on which the antenna 90 is mounted, and the antenna 90 is embedded in this cavity. The hole 92 is formed to have the same aperture diameter and height as the parabolic reflector mirror and have a shape of a non-parabolic surface. Therefore, the electrically conductive thin film 96 formed on a surface of the hole 92 forms a mirror surface that is the non-parabolic surface.

The hole 92 (electrically conductive thin film 96) is formed to have such an aperture diameter (equal to or less than 1.7 times the wavelength) that does not generate any null points in an antenna pattern on a hemisphere where the reflector mirror reflects radio waves radiated from the primary radiator 94. A feed cable 95 is retained by the dielectric material layer 93 and connected to the primary radiator 94.

In the present embodiment, the antenna 90 is constituted by the hole 92 with the electrically conductive thin film 96, the dielectric material layer 93, and the primary radiator 94. With the electronic apparatus 100 on which such an antenna 90 is mounted, the antenna 90 can be mounted without projecting from the surface of the substrate 91. In addition, the footprint can also be reduced due to the reduced aperture diameter of the antenna 90. The thickness and weight can be thus reduced in comparison with stick antennas and the like in the related art. Higher antenna gain can be obtained because the reflector mirror antenna is used as a basic configuration.

Moreover, since the electrically conductive thin film 96 that forms the mirror surface of the antenna 90 has the non-parabolic shape, it is possible to arbitrarily make adjustment, e.g., setting the frequency band that matches the feed system to be narrower or wider as compared to that of the antenna of the parabolic reflector mirror disclosed in Patent Literature 1.

Although the embodiments of the present invention have been described above, the present technology is not limited to the above-mentioned embodiments and various modifications can be made as a matter of course.

Although the present invention is applied to the antenna mounted on the flying object such as the rocket and the aircraft as an example in the above embodiments, the present invention can also be applied to a movable object such as a train, an automobile, and an underwater craft, an electronic apparatus such as a portable terminal and a personal computer (PC), and a building. In a case where the antenna according to the present invention is mounted outside or inside a building, the antenna can be made unremarkable by using the same color and patterns for a front surface of the antenna as the wall or ceiling of the building.

REFERENCE SIGNS LIST

10, 90 antenna
11, 94 primary radiator
12, 121, 122, 123 reflector mirror
12*a* aperture plane
12*b* mirror surface
12*c* mirror surface bottom portion
13, 93 dielectric material layer
92 hole (cavity)
100 electronic apparatus

The invention claimed is:

1. An antenna, comprising:
a primary radiator that radiates radio waves; and
a reflector mirror that reflects radio waves radiated from the primary radiator, has a same aperture diameter and height as a parabolic reflector mirror whose aperture diameter is equal to or less than 1.7 times a wavelength of the radio waves, and has a non-parabolic surface as a mirror surface shape,
wherein the primary radiator is disposed in a region inside an aperture plane of the reflector mirror,
wherein the reflector mirror has such pattern characteristics that no null points are generated in an antenna pattern on a hemisphere on which the radio waves are reflected and radiated, and
wherein the antenna is configured such that impedance characteristics of the primary radiator are changeable without changing a radiation pattern of the primary radiator.

2. The antenna according to claim 1, wherein the non-parabolic surface has a shape combining non-parabolic surfaces having two or more different shapes.

3. The antenna according to claim 1, wherein the non-parabolic surface has a shape whose height from a mirror surface bottom portion of the reflector mirror is proportional to a distance from a center axis of the reflector mirror raised to an exponent excluding 2, a truncated conical surface, a partially spherical surface, a conical surface, a cylindrical surface, or a shape combining two or more thereof.

4. The antenna according to claim 1, wherein the reflector mirror has a dielectric material layer with which a region inside an aperture plane of the reflector mirror is filled.

5. An electronic apparatus comprising the antenna according to claim 1 that is embedded in a cavity in a surface of a mounting object, on which the antenna is mounted, or inside the mounting object.

6. A method of manufacturing an antenna, comprising:
designing a reflector mirror that reflects radio waves radiated from a primary radiator, has a mirror surface whose aperture diameter is equal to or less than 1.7 times a wavelength of the radio waves, and has a parabolic surface as the mirror surface; and
modifying the mirror surface to be a non-parabolic surface that has a same aperture diameter and height as the parabolic surface and has a shape whose height from a mirror surface bottom portion of the reflector mirror is proportional to a distance from a center axis of the reflector mirror raised to an exponent excluding 2,
wherein the primary radiator is disposed in a region inside an aperture plane of the reflector mirror,
wherein a frequency band that achieves impedance matching with a feed system of the primary radiator is set to be narrower or wider than that of the reflector mirror with the parabolic surface by changing a value of the exponentiation, and
wherein the antenna is configured such that impedance characteristics of the primary radiator are changeable without changing a radiation pattern of the primary radiator.

7. A method of manufacturing an antenna, comprising:
designing a reflector mirror that reflects radio waves radiated from a primary radiator, has a mirror surface whose aperture diameter is equal to or less than 1.7 times a wavelength of the radio waves, and has a parabolic surface as the mirror surface; and
modifying the mirror surface to be a non-parabolic surface that has a same aperture diameter and height as the parabolic surface and has a truncated conical surface shape,
wherein the primary radiator is disposed in a region inside an aperture plane of the reflector mirror,
wherein a frequency band that achieves impedance matching with a feed system of the primary radiator is set to be narrower or wider than that of the reflector mirror with the parabolic surface by changing an aperture diameter of a bottom surface of the mirror surface, and
wherein the antenna is configured such that impedance characteristics of the primary radiator are changeable without changing a radiation pattern of the primary radiator.

* * * * *